United States Patent
Dagley et al.

(10) Patent No.: US 11,080,725 B2
(45) Date of Patent: Aug. 3, 2021

(54) BEHAVIORAL DATA ANALYTICS PLATFORM

(71) Applicant: Capital One Services, LLC, McLean, VA (US)

(72) Inventors: Geoffrey Dagley, McKinney, TX (US); Habeeb Hooshmand, Katy, TX (US); Jason Hoover, Grapevine, TX (US); Stephen Wylie, Carrollton, TX (US); Micah Price, Anna, TX (US); Qiaochu Tang, The Colony, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/387,181

(22) Filed: Apr. 17, 2019

(65) Prior Publication Data

US 2020/0334694 A1   Oct. 22, 2020

(51) Int. Cl.
*G06Q 30/02* (2012.01)
*G06N 20/20* (2019.01)
*G06F 17/18* (2006.01)

(52) U.S. Cl.
CPC ......... *G06Q 30/0201* (2013.01); *G06F 17/18* (2013.01); *G06N 20/20* (2019.01); *G06Q 30/0206* (2013.01)

(58) Field of Classification Search
CPC ............. G06Q 10/06375; G06Q 30/06; G06Q 30/0611
USPC .............................. 705/7.27, 7.28, 7.35, 7.37
See application file for complete search history.

(56) References Cited

U.S. PATENT DOCUMENTS

| 9,747,611 | B2* | 8/2017 | Battista | G06Q 30/0643 |
|---|---|---|---|---|
| 9,811,847 | B2 | 11/2017 | Berger et al. | |
| 10,083,411 | B2* | 9/2018 | Kinsey, II | G06Q 30/0627 |
| 10,115,074 | B1* | 10/2018 | Sethi | G06Q 30/02 |
| 2002/0004735 | A1* | 1/2002 | Gross | G06Q 30/0214 |
| | | | | 705/26.41 |
| 2004/0073569 | A1* | 4/2004 | Knott | G06Q 30/02 |

(Continued)

OTHER PUBLICATIONS

S. Mohebbi and R. Shafaei, "e-Supply network coordination: the design of intelligent agents for buyer-supplier dynamic negotiations," Received: Jun. 14, 2009 / Accepted: Dec. 30, 2009 / Published online: Jan. 26, 2010 © Springer Science+Business Media, LLC 2010.*

(Continued)

*Primary Examiner* — Renae Feacher
(74) *Attorney, Agent, or Firm* — Harrity & Harrity, LLP

(57) ABSTRACT

A behavioral analytics platform may obtain a first data model that has been trained based on behavior data derived from historical sales data associated with a vendor and receive, from a user device, one or more interactions that request information related to one or more financing terms. The behavioral analytics platform may determine one or more financing preferences for a user of the user device based on a second data model that has been trained based on behavior data derived from the one or more interactions. The behavioral analytics platform may determine, based on the first data model and the second data model, a probability that the user of the user device and the vendor will be able to reach an agreement for an item available to purchase from the vendor and provide intelligence data related to the probability for display.

20 Claims, 8 Drawing Sheets

(56) References Cited

U.S. PATENT DOCUMENTS

| | | | |
|---|---|---|---|
| 2004/0177025 A1* | 9/2004 | Spoonhower | G06Q 40/04 705/37 |
| 2007/0038522 A1 | 2/2007 | Bell et al. | |
| 2011/0161197 A1 | 6/2011 | Noy et al. | |
| 2012/0290485 A1* | 11/2012 | Ozonat | G06Q 10/06375 705/80 |
| 2014/0229311 A1 | 8/2014 | Colson et al. | |
| 2016/0171473 A1* | 6/2016 | Pugh | G01G 19/4144 705/23 |
| 2017/0287038 A1* | 10/2017 | Krasadakis | G06Q 30/0201 |
| 2018/0047083 A1* | 2/2018 | Agarwal | G06Q 30/0631 |

OTHER PUBLICATIONS

M. Cao, X. Luo, X. Luo, Z. Dai, "Automated negotiation for e-commerce decision making: A goal deliberated agent architecture for multi-strategy selection," Decsion Support Systems 73 (2015) 1-14.*

B. Shojaiemehr and M. Rafsanjani, "A supplier offer modification approach based on fuzzy systems for automated negotiation in e-commerce," Inf Syst Front (2018) 20:143-160.*

Cao et al., "Behavior Informatics: An Informatics Perspective for Behavior Studies", https://www.researchgate.net/publication/220220872, Jan. 2009, 7 pages.

Cao, In-depth behavior understanding and use: The behavior informatics approach, Apr. 2, 2010, 19 pages.

* cited by examiner

400 →

410 — Obtain a first data model that has been trained using one or more machine learning techniques based on behavior data derived from historical sales data associated with a vendor

420 — Receive one or more interactions from a user device to request information related to one or more financing terms associated with an item available to purchase from the vendor, wherein the one or more interactions specify one or more values for at least one element of a proposed offer for the item available to purchase from the vendor

430 — Determine one or more financing preferences for a user of the user device based on the one or more values specified in the one or more interactions, wherein the one or more financing preferences are determined based on a second data model that has been trained using the one or more machine learning techniques based on behavior data derived from the one or more interactions

440 — Determine a probability that the user of the user device and the vendor will be able to reach an agreement for the item based on the first data model and the second data model

450 — Provide information related to the probability for display via an interface accessible to the user device, wherein the information related to the probability includes one or more recommendations for structuring the proposed offer

FIG. 4

BEHAVIORAL DATA ANALYTICS PLATFORM

BACKGROUND

Informatics generally refers to a branch of information engineering that considers interactions between humans and information along with the construction of interfaces, organizations, technologies, and systems. In particular, individuals and organizations increasingly process information digitally, which has led to the study of informatics with computational, mathematical, biological, cognitive, and social aspects. For example, one area in which informatics are applied is in the area of behavior informatics, which refers to the informatics of behaviors so as to obtain intelligence and insights based on behavioral data derived from web usage, vehicle movements, transactional data, and/or the like. Accordingly, behavior informatics may be used to build computational theories, systems, and tools to model, represent, analyze, and manage behaviors of individuals, groups, and/or organizations.

SUMMARY

According to some implementations, a method may include obtaining a first data model that has been trained using one or more machine learning techniques based on behavior data derived from historical sales data associated with a vendor; receiving one or more interactions from a user device to request information related to one or more financing terms associated with an item available to purchase from the vendor, wherein the one or more interactions specify one or more values for at least one element of a proposed offer for the item available to purchase from the vendor; determining one or more financing preferences for a user of the user device based on the one or more values specified in the one or more interactions, wherein the one or more financing preferences are determined based on a second data model that has been trained using the one or more machine learning techniques based on behavior data derived from the one or more interactions; determining a probability that the user of the user device and the vendor will be able to reach an agreement for the item based on the first data model and the second data model; and providing information related to the probability for display via an interface accessible to the user device, wherein the information related to the probability includes one or more recommendations for structuring the proposed offer.

According to some implementations, a device may include a memory; and one or more processors operatively coupled to the memory, the memory and the one or more processors configured to: model data associated with a plurality of vendors based on historical sales data associated with the plurality of vendors; receive, from a user device, a plurality of requests for information related to one or more items in an inventory of items available to purchase; model data associated with a user of the user device based on one or more variations in one or more values specified in the plurality of requests and one or more patterns in the one or more values specified in the plurality of requests; receive, from the user device, a request including one or more criteria for searching the inventory of items available to purchase; identify, in the inventory of items available to purchase, a plurality of items that match the one or more criteria included in the request, wherein the plurality of items includes a first item available to purchase from a first one of the plurality of vendors and a second item available to purchase from a second one of the plurality of vendors; determine, based on the modeled data associated with the plurality of vendors and the modeled data associated with the user of the user device, a first probability of the user reaching an agreement to complete a transaction with the first one of the plurality of vendors and a second probability of the user reaching an agreement to complete a transaction with the second one of the plurality of vendors; and provide, to the user device, intelligence data for display via an interface accessible to the user device, wherein the intelligence data is based on information related to the first probability and the second probability.

According to some implementations, a non-transitory computer-readable medium may store one or more instructions. The one or more instructions, when executed by one or more processors, may cause the one or more processors to: receive, from a plurality of user devices, a plurality of requests for information related to one or more items; classify users of the plurality of user devices into a plurality of user categories based on one or more patterns in behavior data derived from the plurality of requests, wherein the plurality of user categories are associated with one or more predicted negotiation behaviors; receive, from a vendor device, a request including proposed terms of an offer related to a proposed transaction for at least one item available to purchase, wherein the request includes one or more data attributes associated with a prospective purchaser of the at least one item; match the one or more data attributes associated with the prospective purchaser of the at least one item to one of the plurality of user categories; and provide, to the vendor device, intelligence data for display via an interface accessible to the vendor device, wherein the intelligence data relates to the one or more predicted negotiation behaviors associated with the one of the plurality of user categories matched to the one or more data attributes associated with the prospective purchaser.

BRIEF DESCRIPTION OF THE DRAWINGS

FIGS. 4-6 are flow charts of example processes for performing behavioral data analytics to generate intelligence data based on predicted negotiation behaviors.

DETAILED DESCRIPTION

Figure 1A:
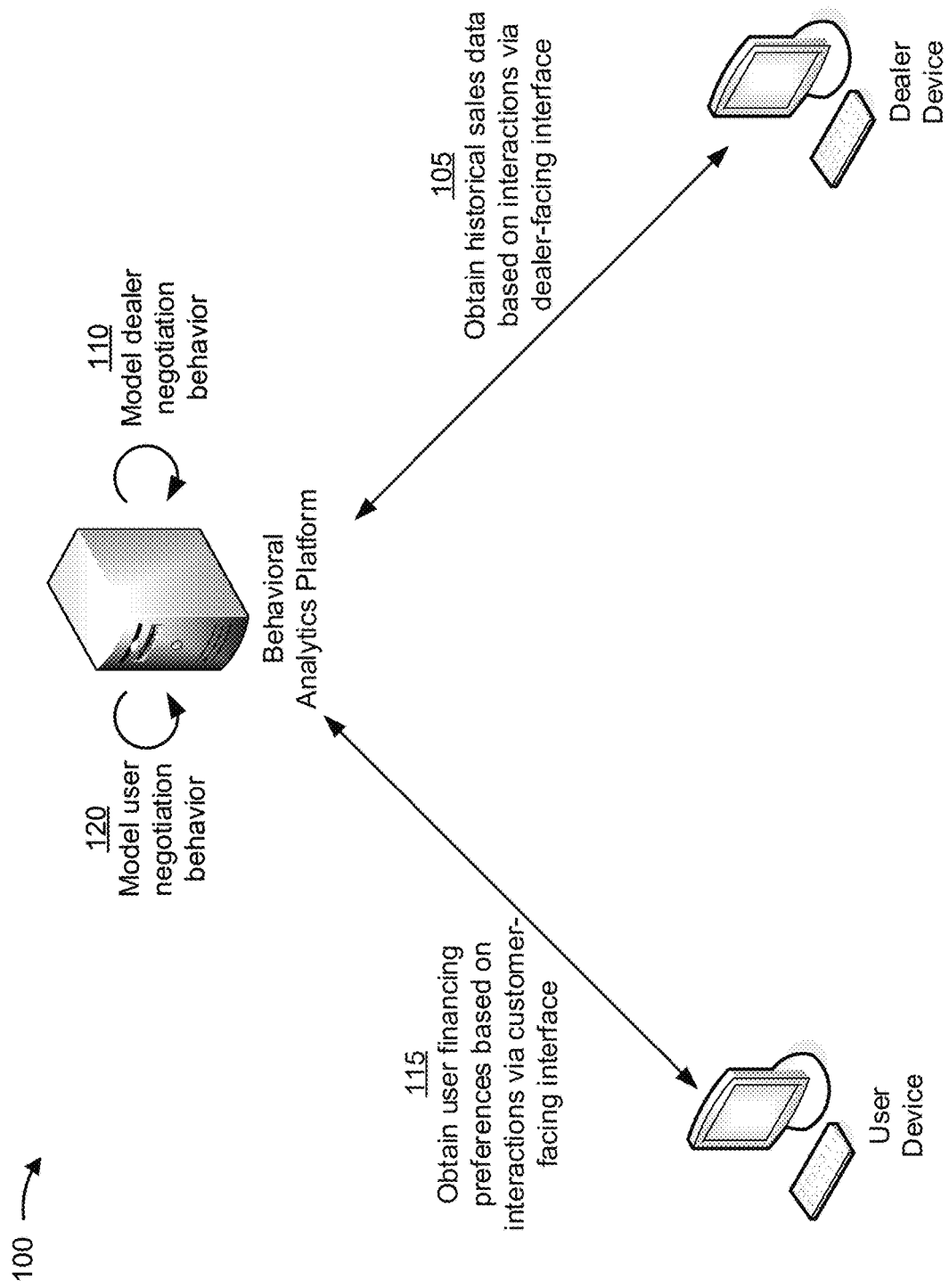
FIGS. 1A-1C are diagrams of one or more example implementations described herein.

The following detailed description of example implementations refers to the accompanying drawings. The same reference numbers in different drawings may identify the same or similar elements.

Vehicle sales processes tend to be time-consuming, resource-intensive, and generally inefficient. For example, a customer will typically have to haggle with salespeople over price, negotiate with banks and/or finance managers for a loan or lease, negotiate a deal for a trade-in, and/or the like. Furthermore, even after a customer and a vendor (e.g., a vehicle dealer) have agreed on terms in principle, a typical sales process may include further steps to gather information about the customer, appraise the vehicle, arrange financing for the vehicle, structure a deal for the vehicle, and present an aftermarket pitch to sell various add-on items (e.g., extended warranties, gap insurance, and/or the like) before final paperwork is completed. Accordingly, non-linear and complex vehicle sales processes are often rife with potential deal-breaking decision points, as a lack of transparency during customer interactions with sales and finance personnel often results in distrust and causes many customers to feel intimidated. One reason for this is that vehicle negotiations tend to be unbalanced in favor of the dealer, with professional salespeople working with customers every day whereas most vehicle shoppers only purchase a vehicle every few years.

One approach that customers often take to even the playing field is to conduct research in advance in order to be prepared before starting to visit dealers. For example, a customer may conduct research to find a vehicle that fits the customer's needs and budget, investigate pricing variables (e.g., sticker price, invoice price, demand for the vehicle, and/or the like), learn about available options (e.g., different trim levels, accessories, add-on products, and/or the like), and/or the like. Furthermore, customers may conduct further research into dealer reputations to learn about sales tactics, search for dealerships with special offers (e.g., cash back incentives, low-interest financing, and/or the like), find out which dealers have better customer satisfaction ratings, and/or the like. While these activities may help a customer to be more prepared before visiting a dealer, these activities also consume substantial resources (e.g., processor resources, memory resources, communication resources, and/or the like). Further, customers may be overwhelmed with the amount of vehicle data that is available and/or have difficulty qualitatively assessing which information to trust (e.g., a dealer could submit positive self-serving reviews that do not accurately reflect the sales tactics that customers experience).

The vehicle sales process also tends to be inefficient and wasteful from the perspective of dealers. For example, when discussing prices with a potential customer, a salesperson will often submit various values (e.g., purchase price, down payment, trade-in value, and/or the like) to a financing department or lending institution. In many cases, vehicle pricing negotiations will involve multiple iterations, which may introduce process repetitions that can waste various computing resources (e.g., processor and/or memory resources to calculate financing options multiple times based on different input values, communication resources to convey information between dealer systems and systems associated with a lending institution multiple times, and/or the like). Furthermore, if negotiations break down prior to consummating a sale and/or a customer shops around at different dealerships in search of the best deal, the potential for wasted resources, wasted time, and/or other inefficiencies increases.

Accordingly, one consistent point of friction between customers and a vehicle dealer is that an amount that the customer expects to pay for a vehicle may substantially differ from an amount for which the dealer is willing to sell the vehicle. Although the dealer may try to meet the customer halfway (or vice versa), the practical reality is that reaching an agreement may be difficult or impossible if the customer and the dealer are starting from two substantially different price points. This can lead to many wasted hours spent negotiating, wasted fuel taking test drives and/or driving to multiple dealerships, using computing and/or network resources to submit financing terms that may never bear fruit, and/or the like.

Some implementations described herein may utilize a behavioral analytics platform to predict one or more financing preferences for a customer based on one or more data models derived from data that relates to customer behavior patterns, and to predict deal structures likely to be acceptable to a vehicle dealer based on one or more data models derived from historical sales data associated with the vehicle dealer. Accordingly, the behavioral analytics platform may match the customer to the vehicle dealer based on the prediction(s) that relate to the one or more financing preferences for the customer and the prediction(s) that relate to the deal structures likely to be acceptable to the vehicle dealer (e.g., based on one or more scores indicating that the customer and the vehicle dealer will likely be able to agree upon mutually acceptable terms). For example, in some implementations, the behavioral analytics platform may generate, receive, or otherwise obtain a first data model that has been trained to predict negotiation behavior associated with a vehicle dealer (e.g., based on historical sales data associated with the vehicle dealer) and a second data model that has been trained to predict negotiation behavior including one or more financing preferences for the customer (e.g., based on one or more interactions with a customer-facing interface, as described in further detail below). In some implementations, the behavioral analytics platform may use a third data model to predict a compatibility between the customer and the dealer (e.g., based on a probability of the customer and the vehicle dealer being able to reach an agreement based on the predicted negotiation behavior associated with the vehicle dealer and the predicted financing preferences for the customer).

In some implementations, the behavioral analytics platform may be associated with a customer-facing interface that allows customers to perform one or more interactions to search vehicle inventories, specify certain financing terms, calculate a monthly payment, and/or the like, and the behavioral analytics platform may generate one or more behavior vectors for the customer based on the one or more interactions. The one or more behavior vectors may be used as input to the one or more data models derived from the data that relates to the customer behavior patterns, and the one or more data models may be trained to output information that relates to the financing preferences for the customer based on the one or more behavior vectors and the data that relates to the customer behavior patterns.

Furthermore, in a similar respect, the behavioral analytics platform may be associated with a dealer-facing interface that allows a dealer to perform one or more interactions to input information related to vehicle inventories, financing terms during a course of negotiations (e.g., an advertised price, an initial offered price, intermediate offer terms, final financing terms, and/or the like), add-on products (e.g., an extended warranty, an insurance policy, a periodic maintenance package, a damage protection policy, a loss protection policy, and/or the like), and/or the like, which can be used to derive the historical sales data for the dealers. The behavioral analytics platform may use the historical sales data to analyze negotiation behavior for the dealer and/or identify patterns in data that indicate how the dealer tends to negotiate deals with customers, including movements in price, adding and/or removing add-on products during negotiations, variations in negotiation behavior depending on timing (e.g., within a year, a month, or another suitable time period), inventory size, popularity or demand for a given make and model, and/or the like.

Accordingly, based on the prediction(s) related to the financing preferences for the customer and the deal structures likely to be acceptable to the vehicle dealer, the behavioral analytics platform may generate one or more scores that relate to a probability of the customer and the vehicle dealer agreeing on terms for a vehicle purchase and provide the customer and/or the vehicle dealer with intelligence data to facilitate a mutually acceptable deal. In this way, the behavioral analytics platform may produce intelligence data that can potentially reduce a quantity of iterations that occur during a course of negotiations, which may conserve computing resources (e.g., processor resources, memory resources, communication resources, and/or the like) that would otherwise be wasted calculating payment options, submitting requests for financing approval, and/or the like based on financing terms that are eventually rejected or revised. Furthermore, by matching customers to dealers with whom a deal is more likely to be completed, the behavioral analytics platform may conserve computing resources that would otherwise be wasted repeating various sales processes (e.g., collecting customer data, submitting financing terms, and/or the like) at various dealerships. This may also conserve computing resources that would otherwise be wasted by the customer conducting research regarding dealer reputations, sales tactics, promotional offers, and/or the like.

Figure 1B:
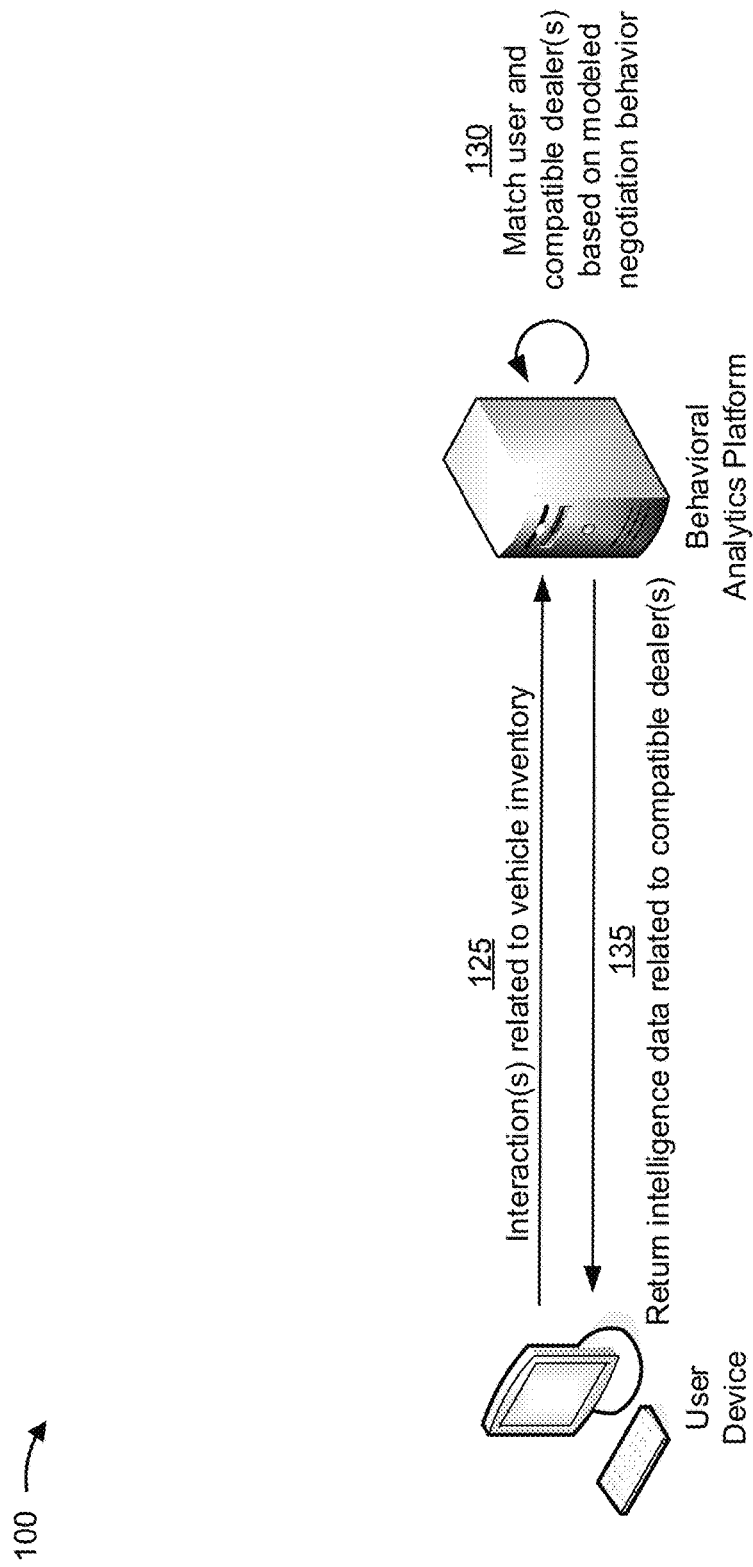
Figure 1C:
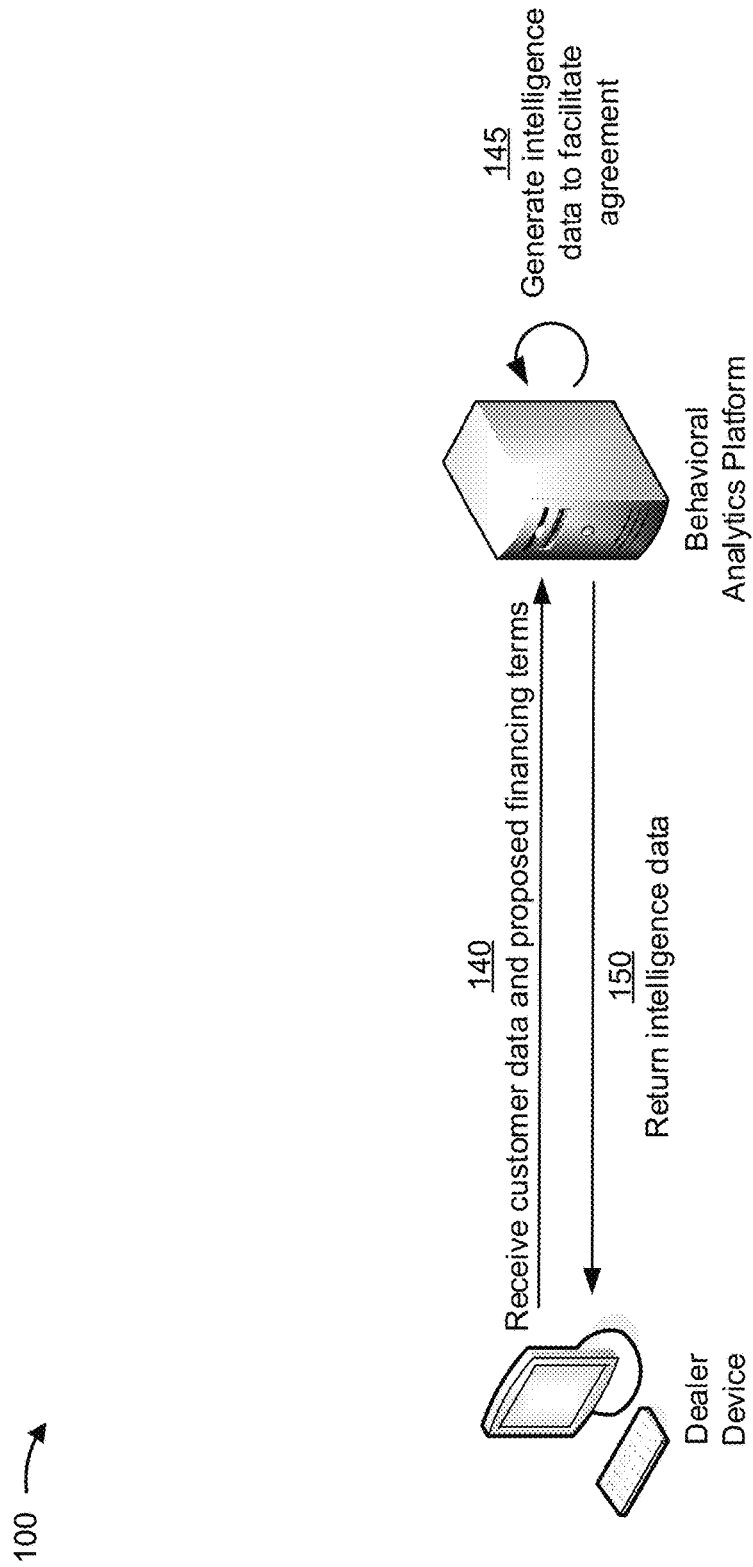

FIGS. 1A-1C are diagrams of one or more example implementations 100 described herein. As will be described in further detail herein, an example implementation 100 can include a behavioral analytics platform, a user device (e.g., a device associated with a user shopping for a vehicle), and a dealer device (e.g., a device associated with a vehicle dealer). As shown in FIG. 1A, the behavioral analytics platform may model negotiation behavior associated with a vehicle dealer based on historical sales data, and also may model negotiation behavior associated with the user of the user device based on one or more interactions received from the user device that relate to vehicle financing preferences. As shown in FIG. 1B, the behavioral analytics platform may match the user of the user device to one or more compatible dealers based on the modeled negotiation behavior and provide, to the user device, intelligence data related to the compatible dealer(s). As shown in FIG. 1C, the behavioral analytics platform may also predict a probability of the user and the vehicle dealer reaching an agreement for a sale of a vehicle and return, to the dealer device, intelligence data to facilitate the agreement.

As shown in FIG. 1A, and by reference number 105, the behavioral analytics platform may obtain historical sales data associated with the vehicle dealer based on one or more interactions with the dealer device via a dealer-facing interface. For example, in some implementations, the behavioral analytics platform may be associated with a financial institution, a lending institution, and/or another suitable entity that offers vehicle financing to customers of the vehicle dealer. Furthermore, as noted above, the behavioral analytics platform may provide the dealer-facing interface to allow a dealer to perform one or more interactions to input information related to vehicle inventories, financing terms during a course of negotiations (e.g., an advertised price, an initial offered price, intermediate offer terms, final financing terms, and/or the like), add-on products (e.g., an extended warranty, an insurance policy, a periodic maintenance package, a damage protection policy, a loss protection policy, and/or the like), miscellaneous fees (e.g., tax, title, and license fees, document fees, dealer preparation fees, delivery charges), and/or the like.

Accordingly, in addition to supplying the behavioral analytics platform with information relating to a vehicle inventory that can be searched by the user device, the behavioral analytics platform may have visibility into various values that the dealer device submits to the entity that offers vehicle financing to customers of the vehicle dealer during negotiations. For example, in some implementations, a customer may obtain dealer-arranged financing through a process in which information about the customer (e.g., name, address, social security number, income, debts, and/or the like) is entered into the dealer device and sent to a prospective lender associated with the behavioral analytics platform. In such cases, the information sent to the prospective lender may further include an offered price, a down payment value, a trade-in value (if applicable), values for one or more add-on products, miscellaneous fees, and/or the like, which can be used to determine a total value to be financed.

The prospective lender may determine whether the customer is qualified for a loan for the total value to be financed and provide the dealer device with an interest rate (e.g., an annual percentage rate) to finance the loan. If the dealer and the customer subsequently modify one or more financing terms (e.g., by decreasing the offered price, increasing the down payment value, adding and/or removing add-on products, and/or the like), the dealer may submit the modified financing terms to ensure that the customer is still qualified for the loan based on the new total value to be financed. Depending on how negotiations between the customer and the dealer progress, this process may be repeated zero or more times until the customer and the dealer agree on terms to purchase the vehicle, the customer walks away without purchasing the vehicle, and/or the customer arranges financing through a bank, credit union, and/or another lender that is independent of the vehicle dealer.

In this way, the behavioral analytics platform may have visibility into various financing terms that are exchanged between the dealer and the customer during negotiations as well as information relating to the eventual outcome from the negotiations (e.g., whether a purchase was completed, the customer walked away, and/or the like). In this way, the behavioral analytics platform may be able to compare the financing terms that are exchanged during negotiations, advertised financing terms, final financing terms, and/or the like to derive intelligence data that relates to how the dealer tends to negotiate with customers.

Accordingly, as further shown in FIG. 1A, and by reference number 110, the behavioral analytics platform may model negotiation behavior associated with the dealer based on the historical sales data associated with the dealer. In particular, when modeling the dealer negotiation behavior, the behavioral analytics platform may identify various patterns in the historical sales data that indicate how the dealer tends to negotiate with customers, what deals tend to be acceptable to the dealer, and/or the like. For example, the behavioral analytics platform may indicate prices that the dealer has historically advertised for various vehicles, specific makes and models, and/or the like, movements in price (e.g., from the advertised price through to a final contract price, including one or more intermediate offered prices), and/or optional add-on products added to and/or removed from a deal structure during negotiations (e.g., gap insurance, extended warranties, window etching, paint and/or fabric protection, key loss protection, nitrogen-filled tires, damage protection, theft protection, and/or the like).

Furthermore, in some implementations, the patterns that are identified in the historical sales data may indicate how various elements in a deal structure relate to one another. For example, a given dealer may have a tendency to structure deals with a relatively low purchase price and many optional add-on products that add to the total sales price. In another example, dealers may vary with respect to values that are offered for trade-in vehicles (e.g., relative to valuations published by automotive research companies). In some implementations, the patterns that are identified in the historical sales data may be generalized for the dealer, specific to a particular vehicle at the dealer or certain characteristics of a vehicle, and/or the like. For example, the patterns may depend on information that relates to timing within a year (e.g., a dealer may tend to accept lower purchase prices around holidays, during a time of year when inventory turns over, at certain times within a month based on sales quotas, and/or the like), inventory size (e.g., a dealer may tend to accept lower purchase prices when inventory is high in order to move older vehicles and clear space for new inventory), popularity or demand for certain makes and/or models, and/or the like. In some implementations, the patterns that are identified in the historical sales data may also provide insight into deal-breaking decision points for the dealer and/or customers who visited the dealer (e.g., based on terms submitted during negotiations that did not result in a completed sale).

As further shown in FIG. 1A, and by reference number 115, the behavioral analytics platform may obtain information relating to one or more financing preferences for the user of the user device based on one or more interactions that occur via a customer-facing interface. For example, where the behavioral analytics platform is associated with a financial institution, a lending institution, and/or another suitable entity that offers vehicle financing, the user may interact with the entity to request loan prequalification, loan preapproval, and/or the like, and the behavioral analytics platform may learn the one or more financing preferences accordingly (e.g., an affordable monthly payment based on the user's income, debts, and/or the like).

Furthermore, as noted above, the customer-facing interface may be used to perform one or more interactions to search vehicle inventories, model or simulate offer terms, calculate a monthly payment, and/or the like. For example, in some implementations, the user may enter one or more search parameters for a specific vehicle make, model, and/or year, a minimum and/or maximum list price, a minimum and/or maximum monthly payment, a vehicle condition (e.g., new or used), a maximum number of miles for a used car, a specific dealer and/or dealers within a certain radius of a defined location or zip code, and/or the like. The user may select one or more vehicles that are returned in search results based on the one or more search parameters to view more details relating to the one or more vehicles and/or specify one or more values as a basis for calculating estimated payments and/or other financing terms. For example, an annual percentage rate (APR) may be programmatically determined based on information that the user entered to request loan prequalification, preapproval, and/or the like, and the user may be provided with an estimated monthly payment based on the APR in combination with user-specified values for asking price, down payment, trade-in value, miscellaneous fees, optional add-on products, loan and/or lease term, and/or the like. In some implementations, the user may change one or more values to model different monthly payments (e.g., based on different amounts to be financed), and the behavioral analytics platform may have visibility into the various values that the user provides to obtain the financing preferences of the user.

Accordingly, as further shown in FIG. 1A, and by reference number 120, the behavioral analytics platform may model negotiation behavior associated with the user based on the financing preferences derived from the one or more interactions that occur via the customer-facing interface. In particular, when modeling the user negotiation behavior, the behavioral analytics platform may identify various patterns in the information that the user inputs via the customer-facing interface. For example, based on a particular user consistently entering in values for an extended warranty and/or gap insurance when viewing different vehicles, the behavioral analytics platform may determine that the particular user desires to purchase and/or is receptive to purchasing an extended warranty, gap insurance, and/or other optional add-on products. In a contrasting example, if the user consistently leaves fields for optional add-on products empty or enters a zero value for such products, the behavioral analytics platform may determine that the user is not interested in optional add-on products.

In this way, the behavioral analytics platform may model dealer negotiation behavior based on historical sales data and/or other suitable interactions via the dealer-facing interface and further model user negotiation behavior based on one or more interactions via the customer-facing interface. In some implementations, the modeled dealer negotiation behavior and the modeled user negotiation behavior can be used in combination to match potential purchasers and potential dealers based on a probability that the parties will be able to reach a mutually acceptable deal with reference to the financial data that is available to analyze to determine the applicable behavioral analytics for each party. For example, in some implementations, the behavioral analytics platform may generate, receive, or otherwise obtain a data model that uses an appropriate artificial intelligence technique (e.g., a machine learning algorithm, a deep learning algorithm, and/or the like) to predict a compatibility between the potential purchasers and the potential dealer based on the modeled negotiation behavior for the dealer and the user.

In some implementations, a data model as described herein (e.g., the dealer data model, the customer data model, and/or the like) may be a machine learning model. Accordingly, the behavioral analytics platform may generate a machine learning model via training of the machine learning model, may receive a trained machine learning model (e.g., that another device has trained), and/or the like. For example, the behavioral analytics platform may train the machine learning model to output a score that indicates a confidence level or probability associated with a prediction (e.g., a probability of the user and the dealer agreeing on financing terms for a vehicle purchase), a degree to which data matches historical data used to train the machine learning model, and/or the like.

The behavioral analytics platform may train the machine learning model using historical data. For example, the historical data may include historical sales data obtained via the dealer-facing interface, user financing preferences obtained via the customer-facing interface, outcomes from previous negotiations involving one or more dealers and/or users, and/or the like. Additionally, or alternatively, when the behavioral analytics platform inputs the historical data into the machine learning model, a first portion of the historical data may be input as a training set (e.g., to train a machine learning model), a second portion of the historical data may be input as a validation set (e.g., to evaluate an effectiveness of the training of the machine learning model and/or to identify needed modifications to the training of the machine learning model), and a third portion of the historical data may be input as a test set (e.g., to evaluate a finalized machine learning model after training and adjustments to the training using the first portion of the historical data and the second portion of the historical data). Depending on an outcome of testing of the machine learning model, the behavioral analytics platform may perform multiple iterations of training of the machine learning model (e.g., by submitting different portions of the historical data as the training set, the validation set, and the test set).

When training the machine learning model, the behavioral analytics platform may utilize a random forest classifier technique to train the machine learning model. For example, the behavioral analytics platform may utilize a random forest classifier technique to construct multiple decision trees during training and may output a classification of the historical data. Additionally, or alternatively, when training the machine learning model, the behavioral analytics platform may utilize one or more gradient boosting techniques to generate the machine learning model. For example, the behavioral analytics platform may utilize an xgboost classifier technique, a gradient boosting tree, and/or the like to generate a prediction model from a set of weak prediction models.

When training the machine learning model, the behavioral analytics platform may utilize logistic regression to train the machine learning model. For example, the behavioral analytics platform may utilize a binary classification of the historical data (e.g., whether the historical data is indicative of a particular accurate prediction) to train the machine learning model. Additionally, or alternatively, when training the machine learning model, the behavioral analytics platform may utilize a naïve Bayes classifier to train the machine learning model. For example, the behavioral analytics platform may utilize binary recursive partitioning to divide the historical data into various binary categories (e.g., starting with whether the historical data is indicative of a particular accurate prediction). Based on using recursive partitioning, the behavioral analytics platform may reduce utilization of computing resources relative to manual, linear sorting and analysis of data points, thereby enabling use of thousands, millions, or billions of data points to train a machine learning model, which may result in a more accurate machine learning model than using fewer data points.

Additionally, or alternatively, when training the machine learning model, the behavioral analytics platform may utilize a support vector machine (SVM) classifier. For example, the behavioral analytics platform may utilize a linear model to implement non-linear class boundaries, such as via a max margin hyperplane. Additionally, or alternatively, when utilizing the SVM classifier, the behavioral analytics platform may utilize a binary classifier to perform a multi-class classification. Use of an SVM classifier may reduce or eliminate overfitting, may increase a robustness of the machine learning model to noise, and/or the like.

In some implementations, the behavioral analytics platform may train the machine learning model using a supervised training procedure that includes receiving input to the machine learning model from a subject matter expert. In some implementations, the behavioral analytics platform may use one or more other model training techniques, such as a neural network technique, a latent semantic indexing technique, and/or the like. For example, the behavioral analytics platform may perform a multi-layer artificial neural network processing technique (e.g., using a recurrent neural network architecture, two-layer feedforward neural network architecture, a three-layer feedforward neural network architecture, and/or the like) to perform pattern recognition with regard to patterns of historical data for other dealers, and/or the like. In this case, use of the artificial neural network processing technique may improve an accuracy of a supervised learning model generated by the behavioral analytics platform by being more robust to noisy, imprecise, or incomplete data, and by enabling the behavioral analytics platform to detect patterns and/or trends undetectable to human analysts or systems using less complex techniques. Furthermore, when using a recurrent neural network architecture, long short-term memory (LSTM) may be employed to classify, make predictions, and/or otherwise process time-series data, which may be useful to predict how certain dealers behave at given times within a month, a year, and/or the like.

As an example of training the machine learning model using a supervised training procedure, the behavioral analytics platform may use a supervised multi-label classification technique to train the machine learning model. For example, as a first step, the behavioral analytics platform may map historical data associated with other dealers, customers, and/or the like to a set of previously generated models after labeling the historical data. In this case, the classification of historical data and/or other dealers, customers, and/or the like may be characterized as having been accurately or inaccurately predicted, and/or the like (e.g., by a technician, thereby reducing processing relative to the behavioral analytics platform being required to analyze each dealer, customer, and/or the like). Furthermore, in some implementations, the behavioral analytics platform may perform one or more dimensionality reduction techniques to reduce the historical data (e.g., to cull duplicate or similar entries), thereby reducing processing to train the machine learning model, conserving storage resources, increasing accuracy by avoiding training the machine learning model in a way that places more importance on certain attributes and/or variables that appear more often in the historical data, potentially reducing the collection of sensitive data that could reveal or enable inference of personally identifiable information (PII) associated with a specific person, and/or the like.

As a second step, the behavioral analytics platform may determine classifier chains, whereby labels of target variables may be correlated (e.g., in this example, labels may be a result of a historical prediction and correlation may refer to historical predictions common to the different labels, and/or the like). In this case, the behavioral analytics platform may use an output of a first label as an input for a second label (as well as one or more input features, which may be other historical data), and may determine a likelihood that a particular entity (e.g., a dealer, a customer, and/or the like) is to be associated with at least one classification based on a similarity to other entities that are associated with similar data. In this way, the behavioral analytics platform transforms classification from a multi-label classification problem to multiple single-classification problems, thereby reducing processing utilization.

As a third step, the behavioral analytics platform may determine a Hamming Loss Metric relating to an accuracy of a label in performing a classification by using the validation set of the historical data (e.g., an accuracy with which a weighting is applied to each entity and whether each entity is associated with a particular classification, results in a correct classification, and/or the like, thereby accounting for variations among historical data for different entities, groups of entities, and/or the like).

As a fourth step, the behavioral analytics platform may finalize the machine learning model based on labels that satisfy a threshold accuracy associated with the Hamming Loss Metric, and may use the machine learning model for subsequent determination of other models.

As another example, the behavioral analytics platform may determine, using a linear regression technique, that a threshold percentage of values of data elements, in a set of values of data elements, do not indicate a particular or threshold likelihood for a prediction, and may determine that those values of data elements are to receive relatively low association scores. In contrast, the behavioral analytics platform may determine that another threshold percentage of values of data elements indicates a particular or threshold likelihood for the prediction, and may assign a relatively high association score to those values of data elements. Based on the characteristics of the data elements indicating a likelihood of prediction, or not, the behavioral analytics platform may generate the model and may use the model for analyzing new data elements related to a new entity (e.g., a new dealer, customer, and/or the like) that interacts with the behavioral analytics platform.

Accordingly, the behavioral analytics platform may use artificial intelligence techniques, machine learning techniques, deep learning techniques, and/or the like to determine a likelihood of an accurate prediction for a dealer, a customer, and/or the like, as described herein.

In some implementations, the behavioral analytics platform may generate a model and may use the model to perform various processes described herein. For example, based on historical data relating to hundreds, thousands, millions or more dealers, customers, and/or the like, the behavioral analytics platform may determine a likelihood of an accurate prediction for a given dealer, a given customer, a given match or pairing between a given dealer and customer, and/or the like. In this case, the model may be an item-based collaborative filtering model, a single value decomposition model, a hybrid recommendation model, and/or another type of model that enables various determinations described herein.

As shown in FIG. 1B, and by reference number 125, the behavioral analytics platform may receive, from the user device, one or more interactions that relate to a vehicle inventory. For example, the one or more interactions may include a request to search a vehicle inventory, a request to model one or more financing terms for a specific vehicle, and/or the like. Based on information related to the one or more interactions, the behavioral analytics platform may predict one or more financing preferences for the user.

As further shown in FIG. 1B, and by reference number 130, the behavioral analytics platform may match the user of the user device to one or more compatible dealers based on one or more data models that relate to modeled negotiation behaviors. For example, in some implementations, the one or more data models may be used to predict negotiation behavior and/or financing preferences associated with the user of the user device, a particular user category based on aggregate behavior associated with a group population that includes a plurality of users, a specific vehicle dealer, a category of vehicle dealers that share similar negotiation tendencies, and/or the like. The behavioral analytics platform may determine a probability that the user of the user device will be able to reach an agreement to purchase a vehicle from one or more dealers based on the modeled negotiation behavior, and the compatible dealer(s) may include dealers for which the probability of reaching an agreement satisfies a threshold value.

As further shown in FIG. 1B, and by reference number 135, the behavioral analytics platform may return, to the user device, intelligence data related to the one or more compatible dealers. The intelligence data may be provided to the user at various stages during a process in which the user is searching for a vehicle. For example, when the user is searching vehicle inventories, the intelligence data can be used to rank a relative relevance of search results based on the probability of the user reaching an agreement with the corresponding dealers. In that regard, the intelligence data may direct the user to a particular dealer, among a plurality of dealers, for which the probability of reaching an agreement is highest. Additionally, or alternatively, the intelligence data may be used to identify and/or filter search results (e.g., if a vehicle has a list price outside a specified range but the dealer's negotiation tendencies indicate that a final sales price is likely to be within the specified range, the vehicle may be included in the search results despite the list price falling outside the specified range). In another example, the intelligence data may include one or more recommendations for structuring a proposed offer that has a greater chance of being accepted by a particular dealer (e.g., recommending values for purchase price, down payment, trade-in value, and/or the like based on values that the dealer has historically accepted for similar vehicles).

In this way, the intelligence data returned to the user device may provide the user with information that enables the user to know what to expect during the buying process. For example, where the dealer's negotiation tendencies indicate that gap insurance is frequently offered, the intelligence data may inform the user about such tendencies so that the user will be prepared if and/or when gap insurance is offered. In some implementations, this intelligence data may be structured as a warning or alert to the user, or if the user's financing preferences indicate that the user is receptive to the optional add-on products, the intelligence data may provide the user with an opportunity to explore different values for the optional add-on products in advance so that the user can determine what value the user would be willing or unwilling to pay for the optional add-on products. In another example, if the user enters a value for asking price that is 10% below the advertised price, indicating a belief that the user will be able to haggle 10% off the advertised price, the intelligence data may indicate a probability of the user being able to reach the desired asking price. For example, if the historical sales data for the dealer indicates that the dealer typically submits the exact sales price or is typically unwilling to negotiate anything more than 5% off the advertised price, then the intelligence data may allow the user to make an informed decision about whether a deal is possible or not.

As shown in FIG. 1C, and by reference number 140, the behavioral analytics platform may receive, from the dealer device, data about a customer and proposed financing terms for an offer to the customer. For example, in some implementations, the data about the customer and the proposed financing terms may be provided in relation to a dealer-arranged financing request, as described elsewhere herein.

As further shown in FIG. 1C, and by reference number 145, the behavioral analytics platform may generate intelligence data to facilitate an agreement with the customer. For example, as mentioned above, the behavioral analytics platform may use one or more machine learning techniques to classify various users in a group population (e.g., users of a plurality of user devices) into a plurality of user categories based on one or more patterns in aggregate behavior data derived from various interactions that occur via the customer-facing interface. In some implementations, the plurality of user categories may be associated with one or more predicted negotiation behaviors, financing preferences, and/or the like based on certain characteristics that are shared among the aggregated users in a given category (e.g., users with a credit score that satisfies a threshold value or falls within a particular range, users with certain income levels, users with certain debt ratios, users that are receptive or unreceptive to optional add-on products, users that prefer to lease vehicles, users sharing certain demographic characteristics, and/or the like).

Accordingly, when the behavioral analytics platform receives the data about the customer and the proposed financing terms for the offer to the customer, the behavioral analytics platform may match one or more data attributes associated with the customer to one or more of the plurality of user categories. The behavioral analytics platform may generate the intelligence data based on the one or more user categories matched to the customer to help facilitate an agreement based on the predicted negotiation behaviors, financing preferences, and/or the like for users that are classified within the one or more user categories. Furthermore, because the intelligence data may be based on certain characteristics that are shared among the aggregated users in a given category (e.g., aggregated data models based on data from groups of similar users), the intelligence data may provide information that relate to predicted negotiation behaviors, financing preferences, and/or the like even if the behavioral analytics platform has no information about a specific user. As further shown in FIG. 1C, and by reference number 150, the behavioral analytics platform may return the intelligence data to the dealer device to facilitate negotiations between the dealer and the customer.

In this way, by basing the intelligence data returned to the dealer device on a category of users rather than the specific customer, the behavioral analytics platform may remain neutral in the negotiations between the customer and dealer. Furthermore, although implementations have been described herein as providing the user device with dealer-specific intelligence data, the intelligence data provided to the user device may similarly be based on aggregate profile data (e.g., behavior patterns among dealers in similar locations, dealers that employ similar sales tactics, and/or the like). In this way, the intelligence data provided to the user device and the dealer device may be presented at a level of granularity that protects the privacy and/or anonymity of the other party, whereby the behavioral analytics platform may remain neutral in the negotiation process while providing informational tools to streamline, aid, or otherwise facilitate negotiations.

In this way, by providing the user device and/or the dealer device with intelligence data to facilitate a mutually acceptable deal, implementations described herein may reduce a quantity of iterations that occur during a course of negotiations, which may conserve computing resources (e.g., processor resources, memory resources, communication resources, and/or the like) that would otherwise be wasted calculating payment options, submitting requests for financing approval, and/or the like multiple times. Furthermore, by matching customers to dealers where a deal is more likely to be completed, implementations described herein may conserve computing resources that would otherwise be wasted repeating various sales processes (e.g., collecting customer data, submitting financing terms, and/or the like) at various different dealerships and/or vehicle resources such as fuel that would otherwise be consumed driving around to different dealerships, taking multiple test drives, and/or the like. Implementations described herein may also conserve computing resources that would otherwise be wasted by the customer conducting research regarding dealer reputations, sales tactics, promotional offers, and/or the like.

As indicated above, FIGS. 1A-1C are provided as one or more examples. Other examples may differ from what is described with regard to FIGS. 1A-1C. For example, although some implementations have been described herein in a context that relates to modeling negotiation behavior to facilitate an agreement for a vehicle purchase, it will be appreciated that implementations described herein can be used in other suitable contexts (e.g., to generate intelligence data that may facilitate an agreement for a real estate sale, a wholesale purchase, a service contract, and/or any other suitable transaction in which a price may be negotiable). Accordingly, as used herein, the term "vendor" and variants thereof may refer to a vehicle dealer or another suitable entity that may be associated with historical sales data that can be used to model negotiation behavior and thereby facilitate negotiations that involve the vendor.

Figure 2:
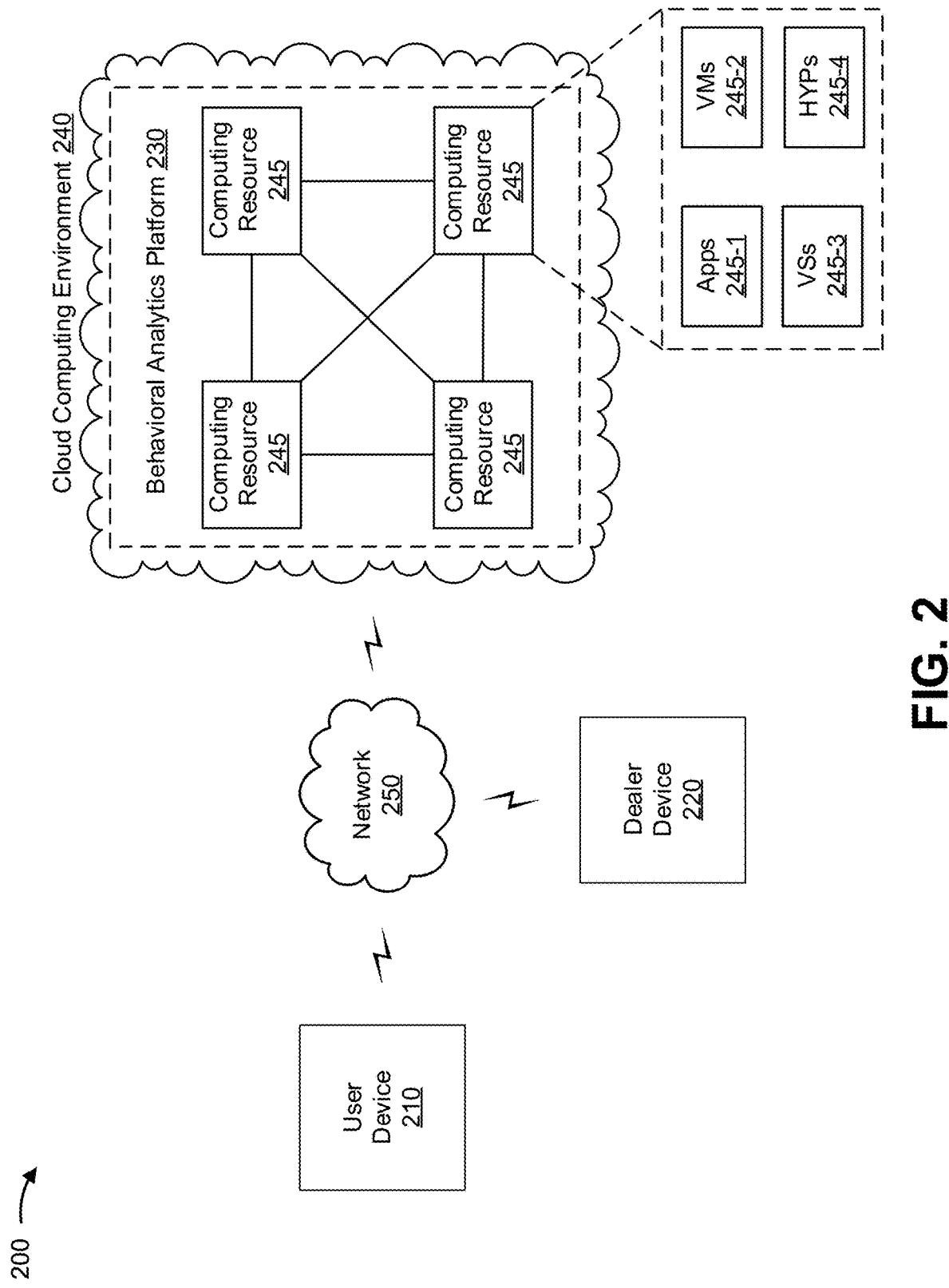
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a dealer device 220, a behavioral analytics platform 230 in a cloud computing environment 240 that includes one or more computing resources 245, a network 250, and/or the like. Devices of environment 200 can interconnect via wired connections, wireless connections, or a combination of wired and wireless connections.

User device 210 includes one or more devices capable of receiving, generating, storing, processing, and/or providing information as described herein. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, and/or the like), a desktop computer, a set-top box, or a similar type of device. In some implementations, user device 210 may be used to perform one or more interactions with behavioral analytics platform 230 via a customer-facing interface and to receive, from behavioral analytics platform 230, intelligence data based on modeled negotiation behavior (e.g., negotiation tendencies) associated with a vehicle dealer, as described elsewhere herein.

Dealer device 220 includes one or more devices capable of receiving, generating, storing, processing, and/or providing information as described herein. For example, dealer device 220 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, and/or the like), a desktop computer, a set-top box, or a similar type of device. In some implementations, dealer device 220 may be used to perform one or more interactions with behavioral analytics platform 230 via a dealer-facing interface and to receive, from behavioral analytics platform 230, intelligence data based on modeled negotiation behavior (e.g., negotiation tendencies) associated with one or more customers, as described elsewhere herein.

Behavioral analytics platform 230 includes one or more devices capable of receiving, generating, storing, processing, and/or providing information as described elsewhere herein. For example, behavioral analytics platform 230 may include a cloud server device or a group of cloud server devices. In some implementations, behavioral analytics platform 230 may be designed to be modular such that certain software components can be swapped in or out depending on a particular need. As such, behavioral analytics platform 230 may be easily and/or quickly reconfigured for different uses.

In some implementations, as shown in FIG. 2, behavioral analytics platform 230 may be hosted in cloud computing environment 240. Notably, while implementations described herein describe behavioral analytics platform 230 as being hosted in cloud computing environment 240, in some implementations, behavioral analytics platform 230 may be non-cloud-based (i.e., may be implemented outside of a cloud computing environment) or may be partially cloud-based.

Cloud computing environment 240 includes an environment that hosts behavioral analytics platform 230. Cloud computing environment 240 may provide computation, software, data access, storage, and/or other services that do not require end-user knowledge of a physical location and configuration of a system and/or a device that hosts behavioral analytics platform 230. As shown, cloud computing environment 240 may include a group of computing resources 245 (referred to collectively as "computing resources 245" and individually as "computing resource 245").

Computing resource 245 includes one or more personal computers, workstation computers, server devices, or other types of computation and/or communication devices. In some implementations, computing resource 245 may host behavioral analytics platform 230. The cloud resources may include compute instances executing in computing resource 245, storage devices provided in computing resource 245, data transfer devices provided by computing resource 245, and/or the like. In some implementations, computing resource 245 may communicate with other computing resources 245 via wired connections, wireless connections, or a combination of wired and wireless connections.

As further shown in FIG. 2, computing resource 245 may include a group of cloud resources, such as one or more applications ("APPs") 245-1, one or more virtual machines ("VMs") 245-2, virtualized storage ("VSs") 245-3, one or more hypervisors ("HYPs") 245-4, and/or the like.

Application 245-1 includes one or more software applications that may be provided to or accessed by user device 210, dealer device 220, and/or the like. Application 245-1 may eliminate a need to install and execute the software applications on user device 210, dealer device 220, and/or the like. For example, application 245-1 may include software associated with behavioral analytics platform 230 and/or any other software capable of being provided via cloud computing environment 240. In some implementations, one instance of application 245-1 may send/receive information to/from one or more other instances of applications 245-1 (e.g., via virtual machine 245-2).

Virtual machine 245-2 includes a software implementation of a machine (e.g., a computer) that executes programs like a physical machine. Virtual machine 245-2 may be either a system virtual machine or a process virtual machine, depending upon use and degree of correspondence to any real machine by virtual machine 245-2. A system virtual machine may provide a complete system platform that supports execution of a complete operating system ("OS"). A process virtual machine may execute a single program and may support a single process. In some implementations, virtual machine 245-2 may execute on behalf of a user (e.g., a user of user device 210, a user of dealer device 220, and/or the like), and may manage infrastructure of cloud computing environment 240, such as data management, synchronization, long-duration data transfers, and/or the like.

Virtualized storage 245-3 includes one or more storage systems and/or one or more devices that use virtualization techniques within the storage systems or devices of computing resource 245. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 245-4 provides hardware virtualization techniques that allow multiple operating systems (e.g., "guest operating systems") to execute concurrently on a host computer, such as computing resource 245. Hypervisor 245-4 may present a virtual operating platform to the guest operating systems and may manage the execution of the guest operating systems. Multiple instances of a variety of operating systems may share virtualized hardware resources.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
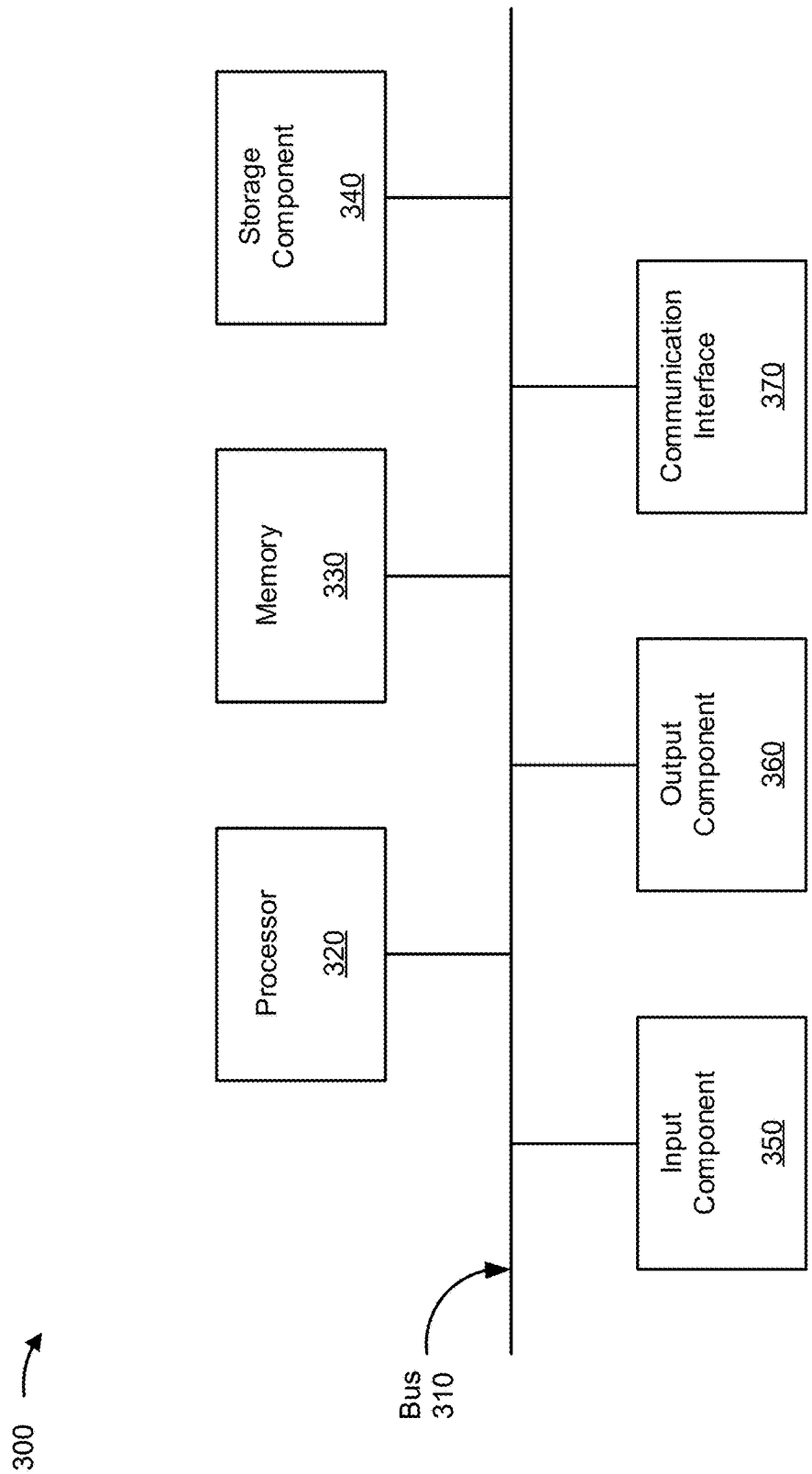
FIG. 3 is a diagram of example components of one or more devices of FIG. 2.

FIG. 3 is a diagram of example components of a device 300. Device 300 may correspond to user device 210, dealer device 220, behavioral analytics platform 230, and/or the like. In some implementations, user device 210, dealer device 220, and/or behavioral analytics platform 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for performing behavioral data analytics to generate intelligence data based on predicted negotiation behaviors. In some implementations, one or more process blocks of FIG. 4 may be performed by a behavioral analytics platform (e.g., behavioral analytics platform 230). In some implementations, one or more process blocks of FIG. 4 may be performed by another device or a group of devices separate from or including the behavioral analytics platform, such as a user device (e.g., user device 210), a dealer device (e.g., dealer device 220), and/or the like.

As shown in FIG. 4, process 400 may include obtaining a first data model that has been trained using one or more machine learning techniques based on behavior data derived from historical sales data associated with a vendor (block 410). For example, the behavioral analytics platform (e.g., using computing resource 245, processor 320, memory 330, storage component 340, input component 350, output component 360, communication interface 370, and/or the like) may obtain a first data model that has been trained using one or more machine learning techniques based on behavior data derived from historical sales data associated with a vendor, as described above.

As further shown in FIG. 4, process 400 may include receiving one or more interactions from a user device to request information related to one or more financing terms associated with an item available to purchase from the vendor, wherein the one or more interactions specify one or more values for at least one element of a proposed offer for the item available to purchase from the vendor (block 420). For example, the behavioral analytics platform (e.g., using computing resource 245, processor 320, memory 330, storage component 340, input component 350, output component 360, communication interface 370, and/or the like) may receive one or more interactions from a user device to request information related to one or more financing terms associated with an item available to purchase from the vendor, as described above. In some implementations, the one or more interactions specify one or more values for at least one element of a proposed offer for the item available to purchase from the vendor.

As further shown in FIG. 4, process 400 may include determining one or more financing preferences for a user of the user device based on the one or more values specified in the one or more interactions, wherein the one or more financing preferences are determined based on a second data model that has been trained using the one or more machine learning techniques based on behavior data derived from the one or more interactions (block 430). For example, the behavioral analytics platform (e.g., using computing resource 245, processor 320, memory 330, storage component 340, input component 350, output component 360, communication interface 370, and/or the like) may determine one or more financing preferences for a user of the user device based on the one or more values specified in the one or more interactions, as described above. In some implementations, the one or more financing preferences are determined based on a second data model that has been trained using the one or more machine learning techniques based on behavior data derived from the one or more interactions.

As further shown in FIG. 4, process 400 may include determining a probability that the user of the user device and the vendor will be able to reach an agreement for the item based on the first data model and the second data model (block 440). For example, the behavioral analytics platform (e.g., using computing resource 245, processor 320, memory 330, storage component 340, input component 350, output component 360, communication interface 370, and/or the like) may determine a probability that the user of the user device and the vendor will be able to reach an agreement for the item based on the first data model and the second data model, as described above.

As further shown in FIG. 4, process 400 may include providing information related to the probability for display via an interface accessible to the user device, wherein the information related to the probability includes one or more recommendations for structuring the proposed offer (block 450). For example, the behavioral analytics platform (e.g., using computing resource 245, processor 320, memory 330, storage component 340, input component 350, output component 360, communication interface 370, and/or the like) may provide information related to the probability for display via an interface accessible to the user device, as described above. In some implementations, the information related to the probability includes one or more recommendations for structuring the proposed offer.

Process 400 may include additional implementations, such as any single implementation or any combination of implementations described below and/or in connection with one or more other processes described elsewhere herein.

In some implementations, the first data model is used to predict negotiation behavior associated with the vendor, the second data model is used to predict negotiation behavior associated with the user of the user device, and the probability is determined based on the predicted negotiation behavior associated with the vendor and the predicted negotiation behavior associated with the user of the user device. In some implementations, one or more of the first data model or the second data model are used to classify the predicted negotiation behavior into one of a plurality of categories based on aggregate behavior data associated with a group population.

In some implementations, the one or more recommendations for structuring the proposed offer include information related to one or more values that the vendor has historically accepted for the at least one element.

In some implementations, the behavioral analytics platform generates a recommended value for the at least one element of the proposed offer based on the one or more values specified in the one or more interactions falling outside a range of values that the vendor has historically accepted for the at least one element. In some implementations, the information related to the probability further includes the recommended value for the at least one element of the proposed offer.

In some implementations, the information related to the probability includes data related to predicted negotiation behavior associated with the vendor based on the historical sales data.

In some implementations, the item is a vehicle and the at least one element of the proposed offer includes a sales price, a down payment, a trade-in, an extended warranty, an insurance policy, a periodic maintenance package, a damage protection policy, and/or a loss protection policy.

In some implementations, the second data model is further based on one or more patterns in the behavior data derived from the one or more interactions.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
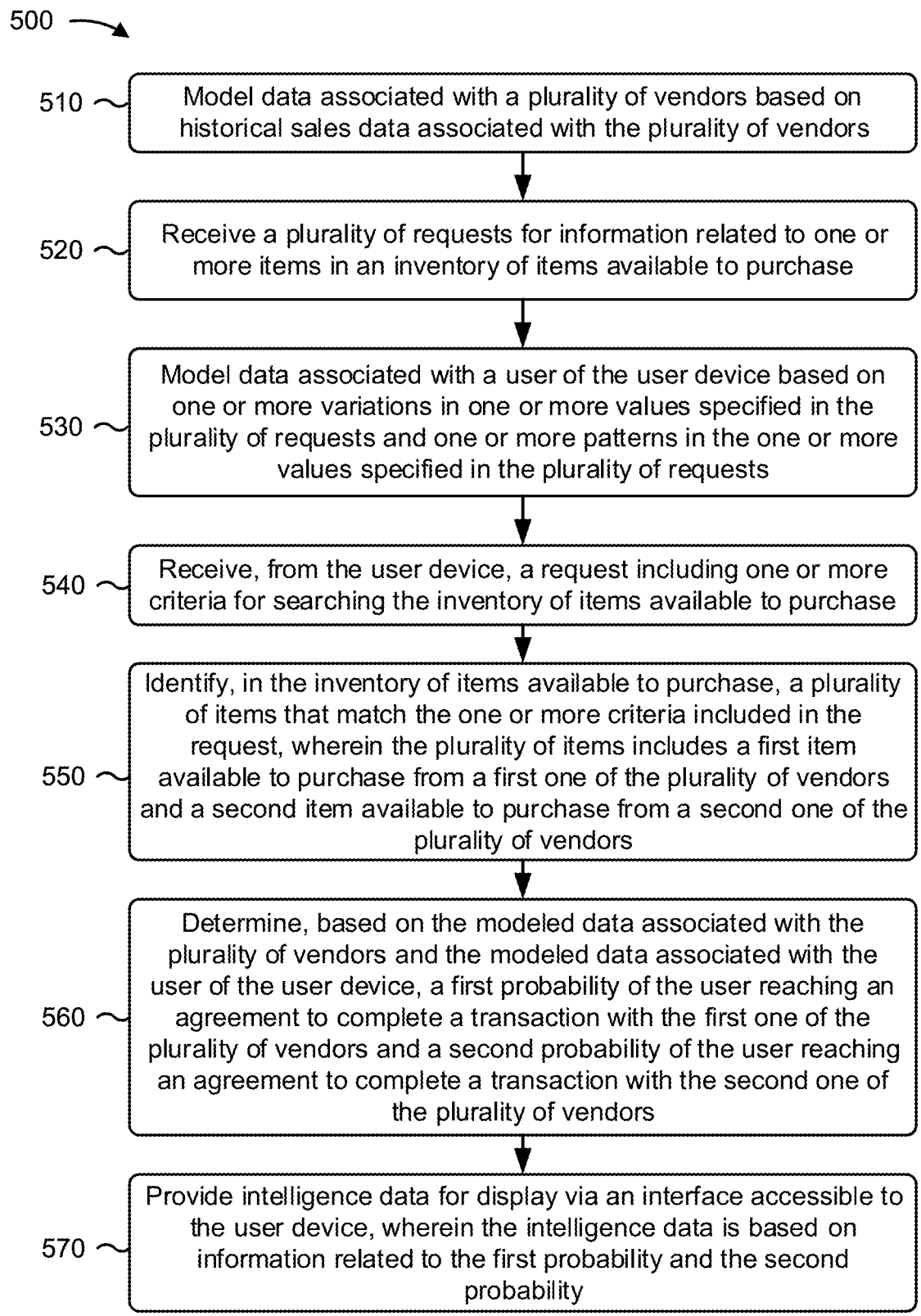

FIG. 5 is a flow chart of an example process 500 for performing behavioral data analytics to generate intelligence data based on predicted negotiation behaviors. In some implementations, one or more process blocks of FIG. 5 may be performed by a behavioral analytics platform (e.g., behavioral analytics platform 230). In some implementations, one or more process blocks of FIG. 5 may be performed by another device or a group of devices separate from or including the behavioral analytics platform, such as a user device (e.g., user device 210), a dealer device (e.g., dealer device 220), and/or the like.

As shown in FIG. 5, process 500 may include modeling data associated with a plurality of vendors based on historical sales data associated with the plurality of vendors (block 510). For example, the behavioral analytics platform (e.g., using computing resource 245, processor 320, memory 330, storage component 340, input component 350, output component 360, communication interface 370, and/or the like) may model data associated with a plurality of vendors based on historical sales data associated with the plurality of vendors, as described above.

As further shown in FIG. 5, process 500 may include receiving, from a user device, a plurality of requests for information related to one or more items in an inventory of items available to purchase (block 520). For example, the behavioral analytics platform (e.g., using computing resource 245, processor 320, memory 330, storage component 340, input component 350, output component 360, communication interface 370, and/or the like) may receive, from a user device, a plurality of requests for information related to one or more items in an inventory of items available to purchase, as described above.

As further shown in FIG. 5, process 500 may include modeling data associated with a user of the user device based on one or more variations in one or more values specified in the plurality of requests and one or more patterns in the one or more values specified in the plurality of requests (block 530). For example, the behavioral analytics platform (e.g., using computing resource 245, processor 320, memory 330, storage component 340, input component 350, output component 360, communication interface 370, and/or the like) may model data associated with a user of the user device based on one or more variations in one or more values specified in the plurality of requests and one or more patterns in the one or more values specified in the plurality of requests, as described above.

As further shown in FIG. 5, process 500 may include receiving, from the user device, a request including one or more criteria for searching the inventory of items available to purchase (block 540). For example, the behavioral analytics platform (e.g., using computing resource 245, processor 320, memory 330, storage component 340, input component 350, output component 360, communication interface 370, and/or the like) may receive, from the user device, a request including one or more criteria for searching the inventory of items available to purchase, as described above.

As further shown in FIG. 5, process 500 may include identifying, in the inventory of items available to purchase, a plurality of items that match the one or more criteria included in the request, wherein the plurality of items includes a first item available to purchase from a first one of the plurality of vendors and a second item available to purchase from a second one of the plurality of vendors (block 550). For example, the behavioral analytics platform (e.g., using computing resource 245, processor 320, memory 330, storage component 340, input component 350, output component 360, communication interface 370, and/or the like) may identify, in the inventory of items available to purchase, a plurality of items that match the one or more criteria included in the request, as described above. In some implementations, the plurality of items includes a first item available to purchase from a first one of the plurality of vendors and a second item available to purchase from a second one of the plurality of vendors.

As further shown in FIG. 5, process 500 may include determining, based on the modeled data associated with the plurality of vendors and the modeled data associated with the user of the user device, a first probability of the user reaching an agreement to complete a transaction with the first one of the plurality of vendors and a second probability of the user reaching an agreement to complete a transaction with the second one of the plurality of vendors (block 560). For example, the behavioral analytics platform (e.g., using computing resource 245, processor 320, memory 330, storage component 340, input component 350, output component 360, communication interface 370, and/or the like) may determine, based on the modeled data associated with the plurality of vendors and the modeled data associated with the user of the user device, a first probability of the user reaching an agreement to complete a transaction with the first one of the plurality of vendors and a second probability of the user reaching an agreement to complete a transaction with the second one of the plurality of vendors, as described above.

As further shown in FIG. 5, process 500 may include providing, to the user device, intelligence data for display via an interface accessible to the user device, wherein the intelligence data is based on information related to the first probability and the second probability (block 570). For example, the behavioral analytics platform (e.g., using computing resource 245, processor 320, memory 330, storage component 340, input component 350, output component 360, communication interface 370, and/or the like) may provide, to the user device, intelligence data for display via an interface accessible to the user device, as described above. In some implementations, the intelligence data is based on information related to the first probability and the second probability.

Process 500 may include additional implementations, such as any single implementation or any combination of implementations described below and/or in connection with one or more other processes described elsewhere herein.

In some implementations, the historical sales data is used to derive data related to historical negotiation behaviors associated with the plurality of vendors. In some implementations, the intelligence data includes a relative relevance of the first item and the second item based on the first probability and the second probability.

In some implementations, the modeled data associated with the user of the user device indicates, based on the one or more patterns, that the user may be receptive to one or more optional products. In some implementations, the first probability and the second probability are determined based on frequencies at which the one or more optional products are included in the historical sales data associated with the first one of the plurality of vendors and the second one of the plurality of vendors. In some implementations, the one or more optional products include at least one of an extended warranty, an insurance policy, a periodic maintenance package, a damage protection policy, or a loss protection policy.

In some implementations, the intelligence data further indicates relative probabilities of the user reaching an agreement to complete the transaction with the first one of the plurality of vendors and of the user reaching an agreement to complete the transaction with the second one of the plurality of vendors.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
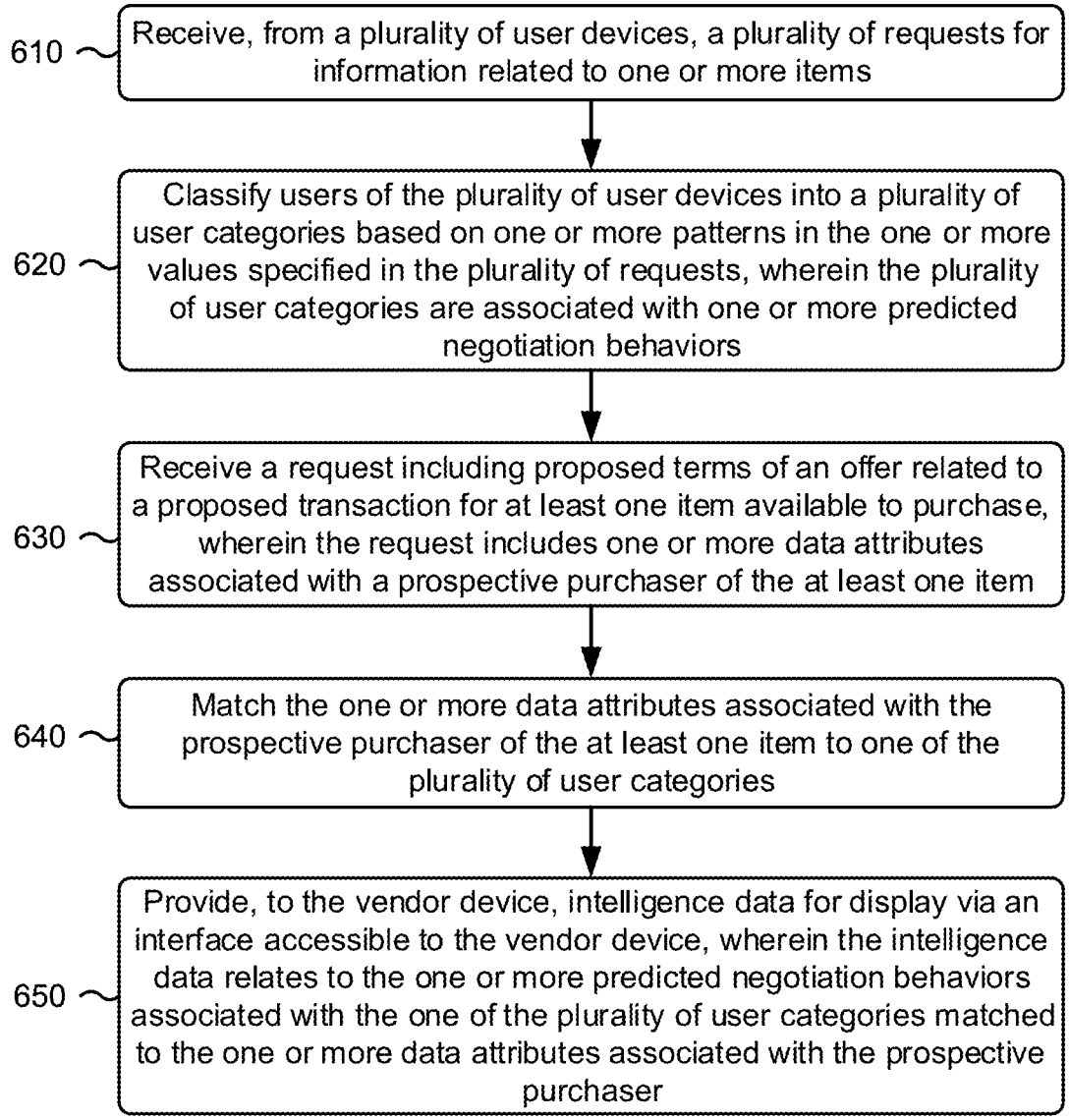

FIG. 6 is a flow chart of an example process 600 for performing behavioral data analytics to generate intelligence data based on predicted negotiation behaviors. In some implementations, one or more process blocks of FIG. 6 may be performed by a behavioral analytics platform (e.g., behavioral analytics platform 230). In some implementations, one or more process blocks of FIG. 6 may be performed by another device or a group of devices separate from or including the behavioral analytics platform, such as a user device (e.g., user device 210), a dealer device (e.g., dealer device 220), and/or the like.

As shown in FIG. 6, process 600 may include receiving, from a plurality of user devices, a plurality of requests for information related to one or more items (block 610). For example, the behavioral analytics platform (e.g., using computing resource 245, processor 320, memory 330, storage component 340, input component 350, output component 360, communication interface 370, and/or the like) may receive, from a plurality of user devices, a plurality of requests for information related to one or more items, as described above.

As further shown in FIG. 6, process 600 may include classifying users of the plurality of user devices into a plurality of user categories based on one or more patterns in behavior data derived from the plurality of requests, wherein the plurality of user categories are associated with one or more predicted negotiation behaviors (block 620). For example, the behavioral analytics platform (e.g., using computing resource 245, processor 320, memory 330, storage component 340, input component 350, output component 360, communication interface 370, and/or the like) may classify users of the plurality of user devices into a plurality of user categories based on one or more patterns in behavior data derived from the plurality of requests, as described above. In some implementations, the plurality of user categories are associated with one or more predicted negotiation behaviors.

As further shown in FIG. 6, process 600 may include receiving, from a vendor device, a request including proposed terms of an offer related to a proposed transaction for at least one item available to purchase, wherein the request includes one or more data attributes associated with a prospective purchaser of the at least one item (block 630). For example, the behavioral analytics platform (e.g., using computing resource 245, processor 320, memory 330, storage component 340, input component 350, output component 360, communication interface 370, and/or the like) may receive, from a vendor device, a request including proposed terms of an offer related to a proposed transaction for at least one item available to purchase, as described above. In some implementations, the request includes one or more data attributes associated with a prospective purchaser of the at least one item.

As further shown in FIG. 6, process 600 may include matching the one or more data attributes associated with the prospective purchaser of the at least one item to one of the plurality of user categories (block 640). For example, the behavioral analytics platform (e.g., using computing resource 245, processor 320, memory 330, storage component 340, input component 350, output component 360, communication interface 370, and/or the like) may match the one or more data attributes associated with the prospective purchaser of the at least one item to one of the plurality of user categories, as described above.

As further shown in FIG. 6, process 600 may include providing, to the vendor device, intelligence data for display via an interface accessible to the vendor device, wherein the intelligence data relates to the one or more predicted negotiation behaviors associated with the one of the plurality of user categories matched to the one or more data attributes associated with the prospective purchaser (block 650). For example, the behavioral analytics platform (e.g., using computing resource 245, processor 320, memory 330, storage component 340, input component 350, output component 360, communication interface 370, and/or the like) may provide, to the vendor device, intelligence data for display via an interface accessible to the vendor device, as described above. In some implementations, the intelligence data relates to the one or more predicted negotiation behaviors associated with the one of the plurality of user categories matched to the one or more data attributes associated with the prospective purchaser.

Process 600 may include additional implementations, such as any single implementation or any combination of implementations described below and/or in connection with one or more other processes described elsewhere herein.

In some implementations, the intelligence data includes a range of values that have historically been accepted by users classified in the category matched to the one or more data attributes associated with the prospective purchaser. In some implementations, the intelligence data indicates a probability of the prospective purchaser agreeing to purchase an optional product that includes at least one of an extended warranty, an insurance policy, a periodic maintenance package, a damage protection policy, or a loss protection policy for the at least one item.

In some implementations, the behavioral analytics platform may receive, from the vendor device, final terms of the offer based on the prospective purchaser agreeing to the proposed transaction for the at least one item. In some implementations, the behavioral analytics platform may update a data model corresponding to the one of the plurality of user categories matched to the one or more data attributes associated with the prospective purchaser based on the prospective purchaser accepting the final terms of the offer. In some implementations, the behavioral analytics platform may model negotiation behavior for an entity associated with the vendor device based on one or more variations among advertised terms for the at least one item, the proposed terms of the offer related to the proposed transaction for the at least one item, and the final terms accepted by the prospective purchaser.

In some implementations, the one or more data attributes include demographic information and/or a credit score associated with the prospective purchaser.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method, comprising:
obtaining, at a device and for a plurality of vendors, historical sales data associated with the plurality of vendors, and historical interaction data identifying historical interactions with a vendor interface associated with a vendor device,
the historical interactions being associated with historical values submitted, via the vendor interface and in association with the historical sales data;
performing, by the device, a dimensionality reduction technique on the historical interaction data to reduce the historical interaction data;
generating, by the device and after performing the dimensionality reduction technique, a first data model by training a first machine learning model using the historical interaction data, the first data model being trained to determine, using vendor interface interactions associated with a vendor, modeled vendor negotiation behavior that indicates how the vendor tends to negotiate terms associated with transactions;
receiving, at the device and based on one or more interactions via a user interface of a user device, a request to search inventory and for information related to one or more financing terms associated with a transaction, wherein the one or more interactions specify one or more values for at least one element of a proposed offer for the transaction;
generating, by the device, a second data model by training a second machine learning model using behavior data derived from the one or more interactions;
determining, by the device, one or more financing preferences for a user of the user device based on the one or more values specified in the one or more interactions and based on the second data model;
determining, by the device, a probability that the user and the vendor will be able to reach an agreement based on the modeled vendor negotiation behavior determined using the first data model and the one or more financing preferences for the user;
generating, by the device and based on the request, search results that are ranked based on:
the probability that the user and the vendor will be able to reach an agreement, and
a probability that the user and another vendor will be able to reach an agreement;
providing, by the device, information related to the search results for display via the user interface,
wherein the information related to the search results includes one or more recommendations for structuring the proposed offer;
receiving, by the device and after providing the information related to the search results, data indicating final terms associated with a final agreement between the user and the vendor or the other vendor; and
updating, by the device, the second data model using variations among advertised terms for the final agreement, the one or more financing preferences for the user, and the final terms.

2. The method of claim 1, wherein the first data model is used to predict negotiation behavior associated with the vendor,
wherein the second data model is used to predict negotiation behavior associated with the user, and
wherein the probability that the user and the vendor will be able to reach an agreement is determined based on predicted negotiation behavior associated with the vendor and the predicted negotiation behavior associated with the user.

3. The method of claim 2, wherein one or more of the first data model or the second data model are used to classify the predicted negotiation behavior associated with the vendor or the predicted negotiation behavior associated with the user into one of a plurality of categories based on aggregate behavior data associated with a group population.

4. The method of claim 1, wherein the one or more recommendations for structuring the proposed offer include information related to one or more values that the vendor has historically accepted for the at least one element.

5. The method of claim 1, further comprising:
generating a recommended value for the at least one element of the proposed offer based on the one or more values specified in the one or more interactions falling outside a range of values that the vendor has historically accepted for the at least one element,
wherein the information related to the probability that the user and the vendor will be able to reach an agreement further includes the recommended value for the at least one element of the proposed offer.

6. The method of claim 1, wherein the information related to the probability that the user and the vendor will be able to reach an agreement includes data related to predicted negotiation behavior associated with the vendor based on the historical sales data.

7. The method of claim 1, wherein the transaction is related to a purchase of a vehicle, and
wherein the at least one element of the proposed offer includes one or more of a sales price, a down payment, a trade-in, an extended warranty, an insurance policy, a periodic maintenance package, a damage protection policy, or a loss protection policy.

8. The method of claim 1, wherein the second data model is further based on one or more patterns in the behavior data derived from the one or more interactions.

9. A device, comprising:
a memory; and
one or more processors operatively coupled to the memory, the memory and the one or more processors configured to:
obtain, for a plurality of vendors, historical sales data associated with the plurality of vendors and historical interaction data identifying historical interactions with a vendor interface associated with a vendor device,
the historical interactions being associated with historical values submitted, via the vendor interface and in association with the historical sales data;
perform a dimensionality reduction technique on the historical interaction data to reduce the historical interaction data;
generate, after performing the dimensionality reduction technique, a first data model, associated with the plurality of vendors, by training a first machine learning model using the historical interaction data, the first data model being trained to determine, using vendor interface interactions associated with a vendor, modeled vendor negotiation behavior that indicates how the vendor tends to negotiate terms associated with transactions;
receive, from a user device, a plurality of requests for information related to one or more items in an inventory of items available to purchase;

generate a second data model, associated with a user of the user device, based on one or more variations in one or more values specified in the plurality of requests and one or more patterns in the one or more values specified in the plurality of requests;

receive, from the user device, a request including one or more criteria for searching the inventory of items available to purchase;

identify, in the inventory of items available to purchase, a plurality of items that match the one or more criteria included in the request,
  wherein the plurality of items includes a first item available to purchase from a first one of the plurality of vendors and a second item available to purchase from a second one of the plurality of vendors;

generate, based on the modeled vendor negotiation behavior determined using the first data model and one or more financing preferences for the user based on the second data model, ranked results for the request, the ranked results including:
  a first probability of the user reaching an agreement to complete a transaction with the first one of the plurality of vendors, and
  a second probability of the user reaching an agreement to complete a transaction with the second one of the plurality of vendors;

provide, to the user device, intelligence data for display via an interface accessible to the user device,
  wherein the intelligence data includes the ranked results;

receive, after providing the intelligence data, data indicating final terms associated with a completed transaction between the user and at least one of the plurality of vendors; and update the second data model using variations among advertised terms for the completed transaction, the one or more financing preferences for the user, and the final terms.

10. The device of claim 9, wherein the historical sales data is used to derive data related to historical negotiation behaviors associated with the plurality of vendors.

11. The device of claim 9, wherein the intelligence data includes a relative relevance of the first item and the second item based on the first probability and the second probability.

12. The device of claim 9, wherein the second data model indicates, based on the one or more patterns, that the user may be receptive to one or more optional products, and
  wherein the first probability and the second probability are determined based on frequencies at which the one or more optional products are included in the historical sales data associated with the first one of the plurality of vendors and the second one of the plurality of vendors.

13. The device of claim 12, wherein the one or more optional products include at least one of an extended warranty, an insurance policy, a periodic maintenance package, a damage protection policy, or a loss protection policy.

14. The device of claim 9, wherein the intelligence data further indicates recommended values for at least one of a purchase price, a down payment, or a trade-in value.

15. A non-transitory computer-readable medium storing instructions comprising:
  one or more instructions that, when executed by one or more processors, cause the one or more processors to:
    obtain historical sales data associated with a plurality of vendors, and historical interaction data identifying historical interactions with a vendor interface associated with a vendor device,
      the historical interactions being associated with historical values submitted, via the vendor interface and in association with the historical sales data;
    perform a dimensionality reduction technique on the historical interaction data to reduce the historical interaction data;
    generate, after performing the dimensionality reduction technique, a first data model by training a first machine learning model using the historical interaction data, first data model being trained to determine, using vendor interface interactions associated with a vendor, modeled vendor negotiation behavior that indicates how the vendor tends to negotiate terms associated with transactions;
    receive, based on one or more interactions via a user interface of a user device, a request to search inventory and for information related to one or more financing terms associated with a transaction,
      wherein the one or more interactions specify one or more values for at least one element of a proposed offer for the transaction;
    generate a second data model by training a second machine learning model using behavior data derived from the one or more interactions;
    determine one or more financing preferences for a user of the user device based on the one or more values specified in the one or more interactions and based on the second data model;
    determine a probability that the user and the vendor will be able to reach an agreement based on the modeled vendor negotiation behavior determined using the first data model and the one or more financing preferences for the user;
    generate, based on the request, search results that are ranked based on:
      the probability that the user and the vendor will be able to reach an agreement, and
      a probability that the user and another vendor will be able to reach an agreement;
    provide information related to the search results for display via the user interface,
      wherein the information related to the search results includes one or more recommendations for structuring the proposed offer;
    receive, after providing the information related to the search results, data indicating final terms associated with a final agreement between the user and the vendor or the other vendor; and
    update the second data model using variations among advertised terms for the final agreement, the one or more financing preferences for the user, and the final terms.

16. The non-transitory computer-readable medium of claim 15, wherein the first data model is used to predict negotiation behavior associated with the vendor,
  wherein the second data model is used to predict negotiation behavior associated with the user, and
  wherein the probability that the user and the vendor will be able to reach an agreement is determined based on predicted negotiation behavior associated with the vendor and the predicted negotiation behavior associated with the user.

17. The non-transitory computer-readable medium of claim 16, wherein one or more of the first data model or the second data model are used to classify the predicted negotiation behavior associated with the vendor or the predicted negotiation behavior associated with the user into one of a plurality of categories based on aggregate behavior data associated with a group population.

18. The non-transitory computer-readable medium of claim 15, wherein the one or more recommendations for structuring the proposed offer include information related to one or more values that the vendor has historically accepted for the at least one element.

19. The non-transitory computer-readable medium of claim 15, wherein the one or more instructions, when executed by the one or more processors, further cause the one or more processors to:
  generate a recommended value for the at least one element of the proposed offer based on the one or more values specified in the one or more interactions falling outside a range of values that the vendor has historically accepted for the at least one element,
    wherein the information related to the probability that the user and the vendor will be able to reach an agreement further includes the recommended value for the at least one element of the proposed offer.

20. The non-transitory computer-readable medium of claim 15, wherein the information related to the probability that the user and the vendor will be able to reach an agreement includes data related to predicted negotiation behavior associated with the vendor based on the historical sales data.

* * * * *